Feb. 7, 1928.
M. F. CARR
1,658,156
LUBRICATING APPARATUS
Filed March 14, 1922
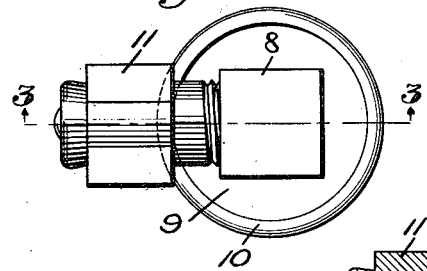
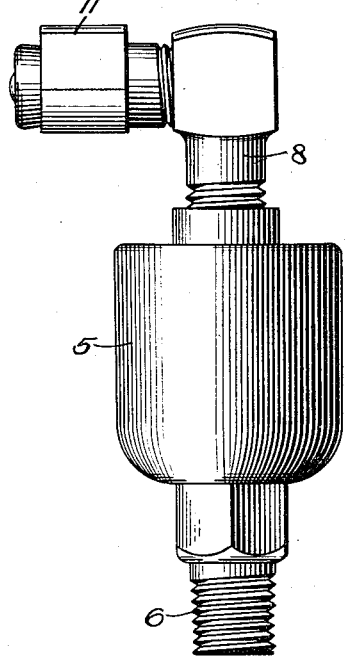
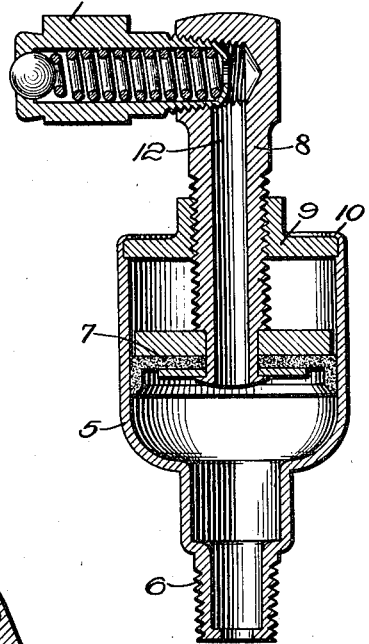
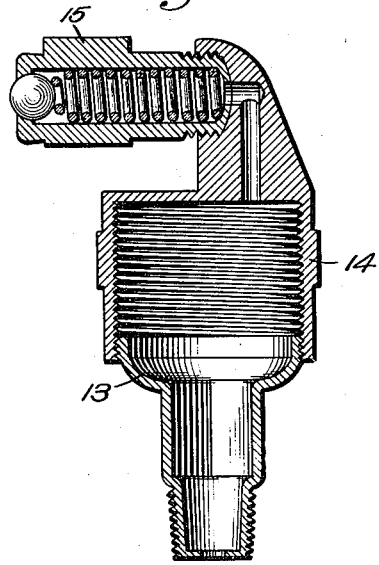
Inventor:
Moses F. Carr.
by Emery Booth Janney & Varney
Attys.

Patented Feb. 7, 1928.

1,658,156

UNITED STATES PATENT OFFICE.

MOSES F. CARR, OF BROOKLINE, MASSACHUSETTS, ASSIGNOR, BY MESNE ASSIGNMENTS, TO THE BASSICK MANUFACTURING COMPANY, OF CHICAGO, ILLINOIS, A CORPORATION OF DELAWARE.

LUBRICATING APPARATUS.

Application filed March 14, 1922. Serial No. 543,645.

This invention pertains to improvements in lubricating apparatus and more particularly, though not exclusively, to improvements in lubricant supply cups.

It is among the objects of the invention to provide a lubricant supply cup which may be conveniently replenished with lubricant from the lubricant supply apparatus which may, if desired, be of the type illustrated in my co-pending application, Serial No. 543,644, filed herewith.

In the drawings, which show a preferred form of one embodiment of my invention, and a modification thereof:—

Figure 1 is a side elevation of a lubricant supply cup;

Fig. 2 is a plan view thereof;

Fig. 3 is a section on the line 3—3 of Fig. 2, being partly in elevation; and

Fig. 4 is a section corresponding to that shown in Fig. 3, but taken through a cup constituting a modification of my invention.

Referring to Figs. 1, 2 and 3 of the drawings and to the preferred form of my invention selected for illustrative purposes, I have shown a lubricant supply cup presenting a body portion 5 adapted to be connected to a part to be lubricated by threads 6, which may be engaged in the tapped hole ordinarily used for grease cups, nipples and the like. Cooperating with the body 5, I have shown a lubricant-expelling portion herein typified by the piston 7 connected to a shank 8, which preferably, as illustrated, is exteriorly threaded and engages an interiorly threaded portion of a head 9 carried by the cup 5 and preferably permanently connected thereto as by a spunover portion 10. Carried by the shank 8, I have shown a lubricant-receiving nipple 11 which preferably, as illustrated, constitutes the male element of a coupling adapted for cooperation with a source of lubricant under pressure, such, for instance, as the lubricant gun illustrated in the co-pending application of Howard J. Murphy, Serial No. 543,649, filed herewith. The nipple 11 is connected to the shank 8 with its axis transverse to the axis of the shank 8 so that, when the body 5 is connected to a part to be lubricated, the nipple 11 may be turned to point in a plurality of directions so that the lubricant replenishing gun or the like may be conveniently connected thereto while the nipple extends in the most favorable or convenient direction. The nipple illustrated is similar to the one shown in the co-pending application above referred to, and presents an interior conduit connecting with the conduit 12 passing through the shank 8 to deliver lubricant into the receptacle or reservoir in the body 5 below or beyond the piston 7. Where, as in the preferred form of my invention illustrated, the nipple 11 is substantially at right angles to the axis of the shank 8, it forms a convenient handle therefor so the lubricant in the chamber beneath the piston 7 may be expelled under pressure by merely turning the shank 8, using the nipple 11 as a handle.

In the modification shown in Fig. 4, the body portion 13 is exteriorly threaded to receive an interiorly threaded lubricant-expelling portion, typified by the cap 14, and the nipple 15 (corresponding to the nipple 11 shown in Fig. 3) is connected to said cap 14 to extend laterally, preferably above the cap 14 as illustrated, so that the advantages described in connection with Fig. 3 may in a measure be attained. It will be understood that the ball checks in the nipples 11 and 15 prevent expulsion of grease through the replenishing nipple during the exertion of pressure on the lubricant by the piston 7 or cap 14.

While I have described a preferred form of my invention and a modification thereof, it will be understood that my invention is best defined by the following claims.

1. A lubricant supply cup presenting a body portion for attachment to the part to be lubricated, a lubricant-expelling portion rotatable relative to said body portion and operable to force lubricant therethrough, and a relatively long lubricant-receiving nipple carried by said expelling portion and rotatable therewith, said nipple having its longitudinal axis transverse to the axis of said expelling portion whereby the disposition of said nipple relative to said body portion may be changed by turning said expelling portion.

2. A lubricant supply cup presenting a body portion for attachment to a part to be lubricated, a lubricant-expelling portion rotatable relative to said body portion to force lubricant therethrough, and a lubricant-receiving nipple carried by said expelling portion, said nipple extending transversely above said expelling portion to provide a handle whereby the latter may be turned.

3. In a lubricating cup, a body portion presenting a reservoir, a piston movable in said reservoir to expel the lubricant content thereof and a lubricant-receiving nipple for supplying lubricant to said reservoir through said piston, said nipple axially transverse to the axis of said piston, thread means operatively interposed between said body portion and piston, said nipple serving as a handle to facilitate turning of said thread means to actuate said piston and also permitting a source of lubricant under pressure to be connected therewith from any direction transverse to the axis of the cup.

4. In a lubricating cup, a body presenting a reservoir, a lubricant-expelling piston in said body, a threaded shank for said piston, a head for said body interiorly threaded for engagement with said shank and a lubricant-receiving nipple carried by said shank on the opposite side of said head from said piston, said nipple connected to said shank with its axis at a substantial angle to the axis of said shank, whereby the direction in which said nipple points may be adjusted for convenient coupling with a lubricant-charging device by merely turning said shank so that the nipple points in the desired direction.

5. A lubricant supply cup comprising, in combination, a body presenting a reservoir, a piston therein, a shank connected to said piston, a head for said body through which said shank passes, and a lubricant supply nipple carried by said shank, said nipple and shank presenting communicating conduits for conveying lubricant to said reservoir beyond said piston, said head permanently secured to said body to preclude loss of said piston.

In testimony whereof, I have signed my name to this specification.

MOSES F. CARR.